United States Patent
Kumar et al.

(10) Patent No.: US 12,421,840 B2
(45) Date of Patent: Sep. 23, 2025

(54) NON-INTRUSIVE INSPECTION METHODOLOGY OF LANDING BASE AND SURFACE PIPE

(71) Applicant: SAUDI ARABIAN OIL COMPANY, Dhahran (SA)

(72) Inventors: Sanjiv Kumar, Udhailiyah (SA); Muhammad Imran Javed, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 328 days.

(21) Appl. No.: 18/319,267

(22) Filed: May 17, 2023

(65) Prior Publication Data
US 2024/0384645 A1    Nov. 21, 2024

(51) Int. Cl.
*E21B 47/00*  (2012.01)
*E21B 47/007*  (2012.01)
*G01B 21/08*  (2006.01)

(52) U.S. Cl.
CPC ............ *E21B 47/007* (2020.05); *G01B 21/08* (2013.01)

(58) Field of Classification Search
CPC .................................................... E21B 47/007
USPC .......................... 73/637, 865.8; 324/238, 242
See application file for complete search history.

(56) References Cited

U.S. PATENT DOCUMENTS

| | | | | |
|---|---|---|---|---|
| 2,150,922 A | * | 3/1939 | Hay ...................... | G01N 27/90 324/241 |
| 3,694,740 A | * | 9/1972 | Bergstrand ......... | G01N 27/9046 324/238 |
| 3,798,961 A | * | 3/1974 | Flambard ............... | G01N 29/28 73/644 |

(Continued)

FOREIGN PATENT DOCUMENTS

| | | | |
|---|---|---|---|
| CN | 211348050 U | 8/2020 | |
| NO | 346694 B1 | * 11/2022 | ............. E21B 17/01 |
| WO | 2011/042413 A1 | 4/2011 | |

OTHER PUBLICATIONS

Adamek et al. "Non Intrusive Sensors—An Answer to Annulus Pressure Monitoring in Subsea Wellhead Equipment," Offshore Technology Conference OTC 7747 (Year: 1995).*

(Continued)

*Primary Examiner* — John Fitzgerald
(74) *Attorney, Agent, or Firm* — Osha Bergman Watanabe & Burton LLP

(57) ABSTRACT

A system includes an equipment platform, an electro-magnetic defectoscopy tool, a signal emitter, a signal receiver, and a computer processor. The equipment platform is formed in a ring-like shape having an orifice of a size large enough to fit a circumference of the wellhead or the casing string within the orifice. The electro-magnetic defectoscopy tool is mounted to the equipment platform. The signal emitter is located in the electro-magnetic defectoscopy tool and is configured to emit a signal towards the orifice of the equipment platform. The signal receiver is located in the (Continued)

electro-magnetic defectoscopy tool and is configured to receive a reflected signal from the wellhead or the casing string. The computer processor is electronically connected to the signal receiver and is configured to receive and use the reflected signal to determine a condition of the wellhead or the casing string.

20 Claims, 4 Drawing Sheets

(56) References Cited

U.S. PATENT DOCUMENTS

| | | | | |
|---|---|---|---|---|
| 4,375,165 | A * | 3/1983 | de Sterke | G01N 29/265 901/44 |
| 5,336,998 | A * | 8/1994 | Watts | G01N 27/82 324/242 |
| 6,967,478 | B2 * | 11/2005 | Wayman | G01N 27/82 324/238 |
| 7,215,118 | B2 * | 5/2007 | Park | B06B 1/08 324/238 |
| 10,190,404 | B2 | 1/2019 | Khalaj Amineh et al. | |
| 10,330,641 | B2 * | 6/2019 | Goroshevskiy | G01V 3/08 |
| 11,662,334 | B2 * | 5/2023 | Liu | G01N 27/83 324/263 |
| 11,867,662 | B2 * | 1/2024 | Pyatnitsky | G01N 33/2045 |
| 2008/0313915 | A1 * | 12/2008 | Dos Santos | E21B 47/006 33/568 |
| 2020/0271818 | A1 | 8/2020 | Fouda et al. | |
| 2022/0065094 | A1 | 3/2022 | Hill, III et al. | |
| 2023/0184717 | A1 * | 6/2023 | Pham | G01N 27/82 324/622 |

OTHER PUBLICATIONS

Stanley "New Results From Electromagnetic and Ultrasonic Inspections of Coiled Tubulars," Society of Petroleum Engineers SPE 121810 (Year: 2009).*

MISTRAS Group, Inc., "Integrated Pipeline Solutions With Data Acquisition, Warehousing, and Predictive Analytics"; <https://www.mistrasgroup.com/who-we-help/industries/oil-and-gas/midstream/pipelines/>; Accessed Dec. 8, 2022 (4 pages).

Aslanyan, A. et al., "Time-Domain Magnetic Defectoscopy for Tubing and Casing Corrosion Detection"; Proceedings of the SPE International Oilfield Corrosion Conference and Exhibition; Paper No. SPE-169601-MS; pp. 1-17; May 12, 2014 (17 pages).

* cited by examiner

NON-INTRUSIVE INSPECTION METHODOLOGY OF LANDING BASE AND SURFACE PIPE

BACKGROUND

Hydrocarbons are located in porous rock formations beneath the Earth's surface. Wells are drilled into the formations to access and produce the hydrocarbons. Wells are formed by drilling a hole, called a wellbore, into the Earth's surface. One or more casing strings are run and cemented into the wellbore. The casing strings are used to support the wellbore and control formation fluid migration.

Casings strings extend from the surface of the Earth into the subterranean formation. At the surface, each casing string is landed out into a casing head that has various seals to seal and hold up the casing string. The casing heads along with any other spools and valves make up the wellhead.

Wells may experience high pressures, temperatures, and corrosion due to the fluids being produced from the formations. Further, wells may produce for many years. As such, routine inspections of a well is important to ensure the structure of the well does not fail and create a well control incident. Part of these routine inspections include inspecting the landing base (i.e., the wellhead) and the surface-extending portion of the casing strings.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for inspecting a wellhead and a casing string. The system includes an equipment platform, an electro-magnetic defectoscopy tool, a signal emitter, a signal receiver, and a computer processor. The equipment platform is formed in a ring-like shape having an orifice of a size large enough to fit a circumference of the wellhead or the casing string within the orifice. The electro-magnetic defectoscopy tool is mounted to the equipment platform. The signal emitter is located in the electro-magnetic defectoscopy tool and is configured to emit a signal towards the orifice of the equipment platform. The signal receiver is located in the electro-magnetic defectoscopy tool and is configured to receive a reflected signal from the wellhead or the casing string. The computer processor is electronically connected to the signal receiver and is configured to receive and use the reflected signal to determine a condition of the wellhead or the casing string.

The method includes disposing an equipment platform, formed in a ring-like shape and having an electro-magnetic defectoscopy tool, around the wellhead or the casing string. The method also includes emitting a signal from a signal emitter located in the electro-magnetic defectoscopy tool towards an orifice of the equipment platform and receiving a reflected signal at a signal receiver located in the electro-magnetic defectoscopy tool from the wellhead or the casing string. The method further includes performing an inspection of the wellhead and the casing string by determining a condition of the wellhead or the casing string using the reflected signal and a computer processor electronically connected to the signal receiver.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
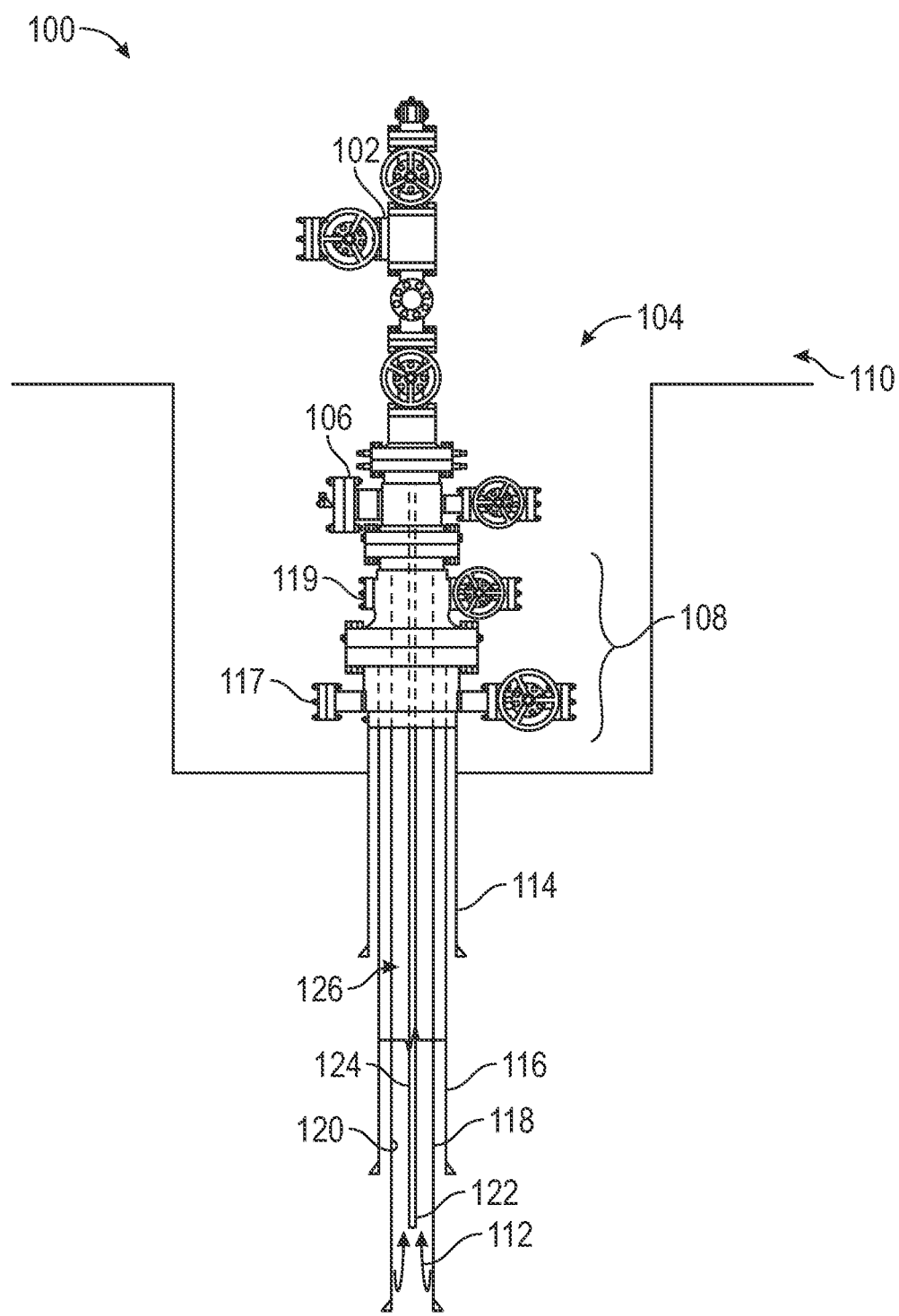
FIG. 1 shows an exemplary well in accordance with one or more embodiments.

FIG. 1 shows an exemplary well (100) in accordance with one or more embodiments. The well (100) includes a tree (102), a tubing head (106), and a wellhead (108) located on a surface location (110) that may be located anywhere on the Earth's surface. The surface location (110) may include a cellar (104). FIG. 1 shows the surface portion of the well (100) located, at least partially, inside of a cellar (104). A cellar (104) is a pit dug in the ground. The cellar (104) prevents the surface equipment from excessively protruding above the ground and allows additional height between the rig floor and the wellhead (108) during drilling or workover operations. While the well (100) in FIG. 1 is shown having a cellar (104), the cellar (104) is not meant to be limiting and any type of surface location (110) configuration may be used without departing from the scope of the disclosure herein.

In accordance with one or more embodiments, the tree (102) has a plurality of valves that control the production of production fluids (112) that come from a production zone located beneath the surface location (110). The valves also allow for access to the subsurface portion of the well (100). The well (100) has three strings of casing: conductor casing (114), surface casing (116), and production casing (118). The casing strings are made of a plurality of long high-diameter tubulars threaded together. The tubulars may be made out of any durable material known in the art, such as steel. The casing strings are cemented in place within the well (100). The casing strings may be fully or partially cemented in place without departing from the scope of the disclosure herein.

Each string of casing, starting with the conductor casing (114) and ending with the production casing (118), decreases in both outer diameter and inner diameter such that the surface casing (116) is nested within the conductor casing (114) and the production casing (118) is nested within the surface casing (116). Upon completion of the well (100), the inner circumferential surface (120) of the production casing (118) and the space located within the production casing (118), make up the interior of the well (100).

The majority of the length of the conductor casing (114), surface casing (116), and production casing (118) are located underground. However, the surface-extending portion of each casing (114, 116, 118) string is housed in the wellhead (108) located at the surface location (110). The wellhead (108) may also be called the landing base without departing from the scope of the disclosure herein. In accordance with one or more embodiments, the wellhead (108) includes a surface casing head (117) housing the surface-extending portion of the surface casing (116) and a production casing head (119) housing the surface-extending portion of the production casing (118).

In accordance with one or more embodiments, the conductor casing (114) does not have a casing head because the conductor casing (114) is a relatively short casing string and acts as the structure that holds back unconsolidated soil and rock at the surface. Further, the conductor casing (114) acts as the structure through which the rest of the well (100) is built upon.

For example, when the surface wellbore is drilled, the surface casing head (117) is installed onto the conductor casing (114) and the drilling equipment is run through the surface casing head (117) and the conductor casing (114) to drill the surface wellbore. When it is time to case the surface wellbore, the surface casing (116) is run through the surface casing head (117) and the conductor casing (114).

Once the surface casing (116) has reached its planned depth, the surface casing (116) is "landed out" into the surface casing head (117). In accordance with one or more embodiments, the surface casing (116) has a landing hanger (not shown) that includes various seals that mate with a seal bore inside of the surface casing head (117). Once the surface casing (116) is landed out into the surface casing head (117), the surface casing (116) may be cemented in place. The cement and the seals between the surface casing (116) and the surface casing head (117) prevent formation fluids from migrating to the surface location (110).

In a similar manner, subsequent casing heads may be installed on top of the surface casing head (117) in order to drill and case subsequent wellbores. The number of casing strings and casing heads depends on the depth and trajectory of the well. FIG. 1 shows the well (100) having only a conductor casing (114), a surface casing (116), and a production casing (118). Further, FIG. 1 shows only a production casing head (119) installed on top of the surface casing head (117). However, the well (100) may have any number of casing strings and any number of casing heads without departing from the scope of the disclosure herein.

Production tubing (122) is deployed within the production casing (118). The production tubing (122) may include a plurality of tubulars connected together and may be interspersed with various pieces of equipment such as artificial lift equipment, packers, etc. The space formed between the outer circumferential surface (124) of the production tubing (122) and the inner circumferential surface (120) of the production casing (118) is called the tubing-casing annulus (126).

The majority of the length of the production tubing (122) is located in the interior of the well (100) underground. However, the surface-extending portion of the production tubing (122) is housed in the tubing head (106) which is installed on top of the wellhead (108). The surface-extending portion of the production tubing (122) may include a tubing hanger (not pictured) that is specially machined to be set and hung within the tubing head (106). The tree (102) is connected to the top of the tubing head (106).

In accordance with one or more embodiments, the production casing (118) may comprise a portion made of slotted casing or screen such that production fluids may flow into the production casing (118) from the formation. In other embodiments, the production casing (118) may include perforations made through the production casing (118), cement, and wellbore in order to provide a pathway for the production fluids (112) to flow from the production zone into the interior of the well (100).

The production fluids (112) may travel from the interior of the well (100) to the surface location (110) through the production tubing (122). A pipeline (not shown) may be connected to the tree (102) to transport the production fluids (112) away from the well (100). The well (100) depicted in FIG. 1 is one example of a well (100) but is not meant to be limiting. The scope of this disclosure encompasses any well (100) design that has at least one string of casing in the well (100) and at least one casing head. Further, the well (100) may have other variations of surface equipment without departing from the scope of this disclosure.

Wells, such as well (100), may experience high pressures, temperatures, and corrosion due to the production fluid (112). Further, the well (100) may produce for many years. As such, routine inspections of the well (100) is important to ensure the structure of the well (100) does not fail and create a well control incident. Part of these routine inspections include inspecting the wellhead (108) and the surface-extending portion of the casing (114, 116, 118) strings.

Conventional wellhead (108) and casing (114, 116, 118) string inspections require multi-stage operations that take multiple crews. Further, conventional inspections are invasive and inaccurate as they often require cutting the conductor casing (114) to visually inspect the surface casing (116) located within the conductor casing (114). In conventional inspections, a plug needs to be run into the well (100) to secure the well (100) in order to cut the conductor casing (114). Further, cutting the conductor casing (114) opens the well (100) to a potential well control incident.

Therefore, the ability to inspect the wellhead (108) and surface-extending portion of the casing (114, 116, 118) strings, without having to cut the conductor casing (114) or enter the interior portion of the well (100), is beneficial. As such, embodiments outlined herein present systems and methods for inspecting the wellhead (108) and surface-extending portion of the casing (114, 116, 118) strings using non-invasive signal production tools.

Figure 2:
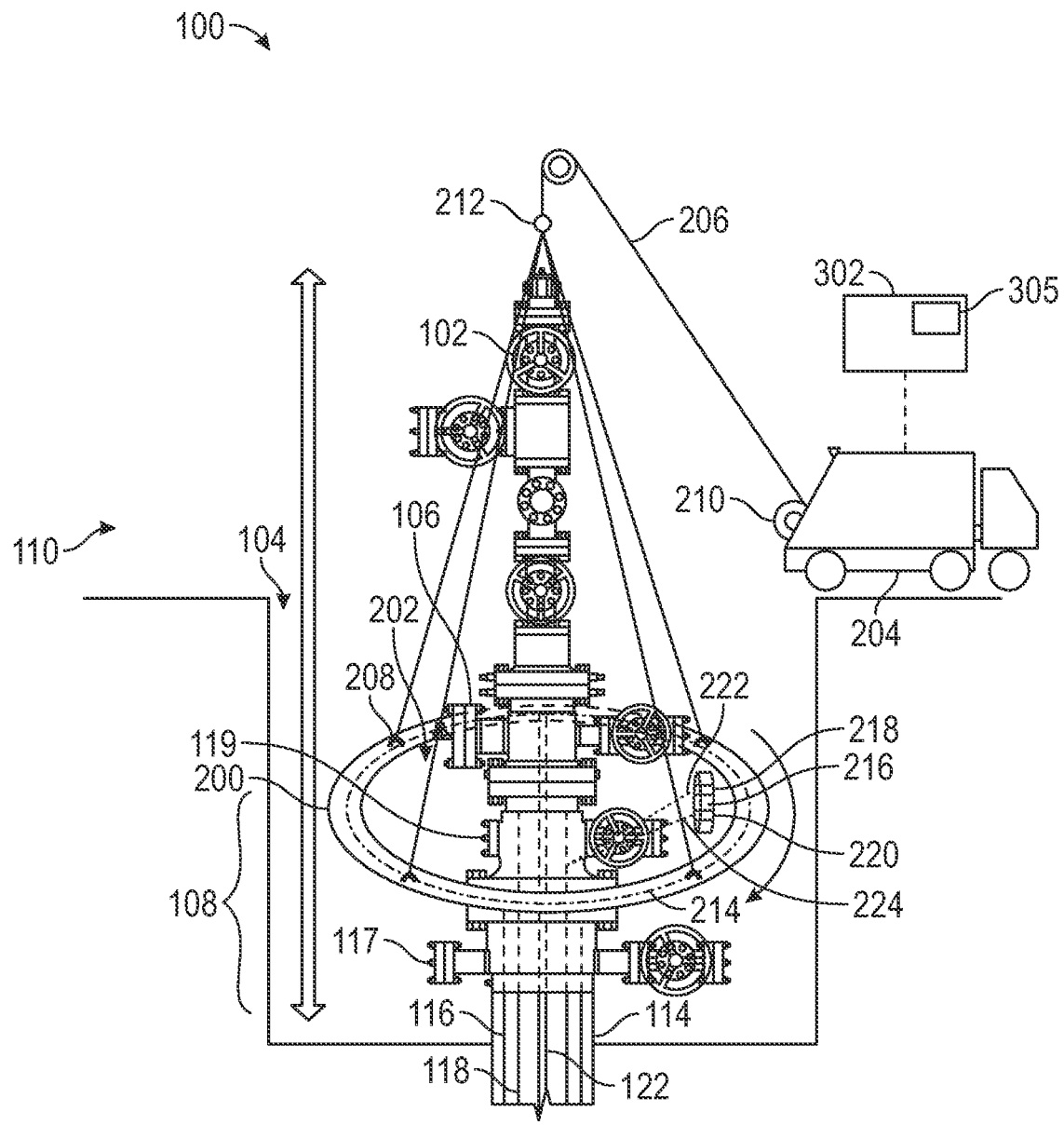
FIG. 2 shows an inspection system in accordance with one or more embodiments.

FIG. 2 shows an inspection system in accordance with one or more embodiments. Components shown in FIG. 2 that are the same as or similar to components shown in FIG. 1 have not been re-described for purposes of readability and have the same description and function as outlined above. The system shown in FIG. 2 may be used to inspect any portion of the well (100) located on or near the surface location (110), such as the wellhead (108) and the surface-extending portions of the conductor casing (114), surface casing (116), and production casing (118).

In accordance with one or more embodiments, the system includes an equipment platform (200). The equipment platform (200) may be formed in a ring-like shape having an orifice (202). The orifice (202) is sized large enough to fit the circumference of the wellhead (108) and the surface-extending portions of the conductor casing (114), surface casing (116), and production casing (118). In further embodiments, the orifice (202) is also large enough to fit the tree (102).

The equipment platform (200) may be made of any material known in the art, such as steel, and may have any thickness without departing from the scope of the disclosure herein. FIG. 2 shows the equipment platform (200) disposed around wellhead (108). In other words, the wellhead (108) is located inside of the orifice (202) of the equipment platform (200).

In further embodiments, the equipment platform (200) is not connected to any portions of the wellhead (108) or tree (102) such that the equipment platform (200) is free to move up and down and rotate around the structure, as depicted by the arrows shown in FIG. 2. The equipment platform (200) may be able to move up and down the entirety of the well (100) that extends above the surface location (110) (including the portion of the well (100) inside of the cellar (104)).

Thus, while FIG. 2 only shows the wellhead (108) being disposed within the orifice (202) of the equipment platform (200), the equipment platform (200) is able to move up and down such that the equipment platform (200) may move down to the surface-extending portions of the casing (114, 116, 118) strings. Thus, the surface-extending portions of the casing (114, 116, 118) strings may also be disposed within the orifice (202) of the equipment platform (200).

In further embodiments, the equipment platform (200) is able to raise, lower, and rotate using a logging truck (204) and wireline (206). Specifically, the equipment platform (200) may have one or more lifting hooks (208). The wireline (206) may be divided into separate pieces of wireline (206) and each piece may be connected to a corresponding lifting hook (208).

FIG. 2, shows the equipment platform (200) having four lifting hooks (208) spaced equidistant from one another around the equipment platform (200). The wireline (206) is shown splitting from a singular wireline (206) to four separate wirelines (206). Each split wireline (206) is connected to a corresponding lifting hook (208). By spacing the lifting hooks (208) equally about the equipment platform (200), the wireline (206) may be able to hold the equipment platform (200) level.

In accordance with one or more embodiments, the wireline (206) may extend to the logging truck (204). The logging truck (204) may have a spool (210) of wireline (206) and the ability to deploy and retract the wireline (206) using the spool (210). Deployment and retraction of the wireline (206) allows the equipment platform (200) to be raised and lowered. The logging truck (204) may have a computer (302) or be connected to a computer (302). The computer (302) has a computer processor (305) and is further outlined below in FIG. 3. The computer (302) may be electronically connected to the wireline (206) and the spool (210) such that the computer (302) or computer processor (305) may send and receive signals along the wireline (206) and instruct the spool (210) to raise or lower the wireline (206).

In further embodiments, the portion of the wireline (206) where the wireline (206) splits to be connected to the lifting hooks (208) may include a rotation device (212). The wireline (206) may be electronically conductive, and signals may be sent along the wireline (206). Thus, a signal may be sent to the rotation device (212) from the logging truck (204) computer (302) to instruct the rotation device (212) to rotate, which, in turn, rotates the equipment platform (200) via the split wireline (206) pieces. The rotation device (212) may also be electronically conductive such that the split wireline (206) connected to the lifting hooks (208) maintains electronic communication with the unsplit wireline (206) connected to the logging truck (204).

In further embodiments, the equipment platform (200) has a data transmitter cable (214). The data transmitter cable (214) may be electronically connected to the wireline (206). The data transmitter cable (214) may be an electric conductor. The data transmitter cable (214) may extend along the entirety of the equipment platform (200), as shown in FIG. 2, or the data transmitter cable (214) may only extend along a portion of the equipment platform (200).

In accordance with one or more embodiments, an electro-magnetic defectoscopy tool (216) is mounted on the equipment platform (200). The electro-magnetic defectoscopy tool (216) may also be electronically connected to the data transmitter cable (214). Thus, the electro-magnetic defectoscopy tool (216) is electronically connected to the wireline (206) and the computer (302) through the data transmitter cable (214).

The electro-magnetic defectoscopy tool (216) includes a signal emitter (218) located in the electro-magnetic defectoscopy tool (216). The signal emitter (218) is configured to emit an emitted signal (222) towards the orifice (202) of the equipment platform (200). The electro-magnetic defectoscopy tool (216) may receive instructions from the computer (302) to emit the emitted signal (222).

The electro-magnetic defectoscopy tool (216) also includes a signal receiver (220) located in the electro-magnetic defectoscopy tool (216). The signal receiver (220) is configured to receive a reflected signal (224). The reflected signal (224) may be a reflection of the emitted signal (222) off of a component of the wellhead (108) or the surface-extending portion of the casing (114, 116, 118) strings. The electro-magnetic defectoscopy tool (216) may be any electro-magnetic defectoscope known in the art. In particular, the electro-magnetic defectoscopy tool (216) may use high-speed transient electromagnetic excitation and data from gamma ray, pressure, and temperature sensors.

FIG. 2 shows the signal emitter (218) emitting an emitted signal (222) towards the wellhead (108) and the signal receiver (220) receiving a reflected signal (224) from the wellhead (108). While FIG. 2 shows only one signal being emitted and reflected, more than one signal and more than one type of signal may be emitted and received without departing form the scope of the disclosure herein.

In particular, the signal emitter (218) of the electro-magnetic defectoscopy tool (216) may emit more than one electromagnetic signals each having a different strength and depth of investigation. In further embodiments, the signal emitter (218) of the electro-magnetic defectoscopy tool (216) emits a sonic signal towards the orifice (202) of the equipment platform (200).

In further embodiments, the reflected signals (224) are transmitted to the computer (302) from the electro-magnetic defectoscopy tool (216) through the data transmitter cable (214) and the wireline (206). The computer processor (305) in the computer (302) may receive the reflected signals (224) and use the reflected signals (224) to determine a condition of the wellhead (108) or the casing (114, 116, 118) strings. In particular, the condition of the wellhead (108) or the casing (114, 116, 118) string may include a thickness of walls within the wellhead (108) or the casing (114, 116, 118) strings.

Software may be located in the computer processor (305) to monitor the thickness and healthiness of the walls of the wellhead (108) and casing (114, 116, 118) strings against the manufacturing nominal thickness. The software may include an instruction to alert to significant metal loss. Significant metal loss could lead to a potential well integrity or well control situation.

The alert mechanism may be set at a percent of metal loss that is determined by the manufacturer provided specification, engineering standards, established guidelines, or engineer's evaluation. In accordance with one or more embodiments, the signal emitter (218) of the electro-magnetic defectoscopy tool (216) emits electro-magnetic signals first followed by sonic signals in order to gather a comprehensive assessment of the wellhead (108) and surface-extending portions of the casing (114, 116, 118) strings.

Figure 3:
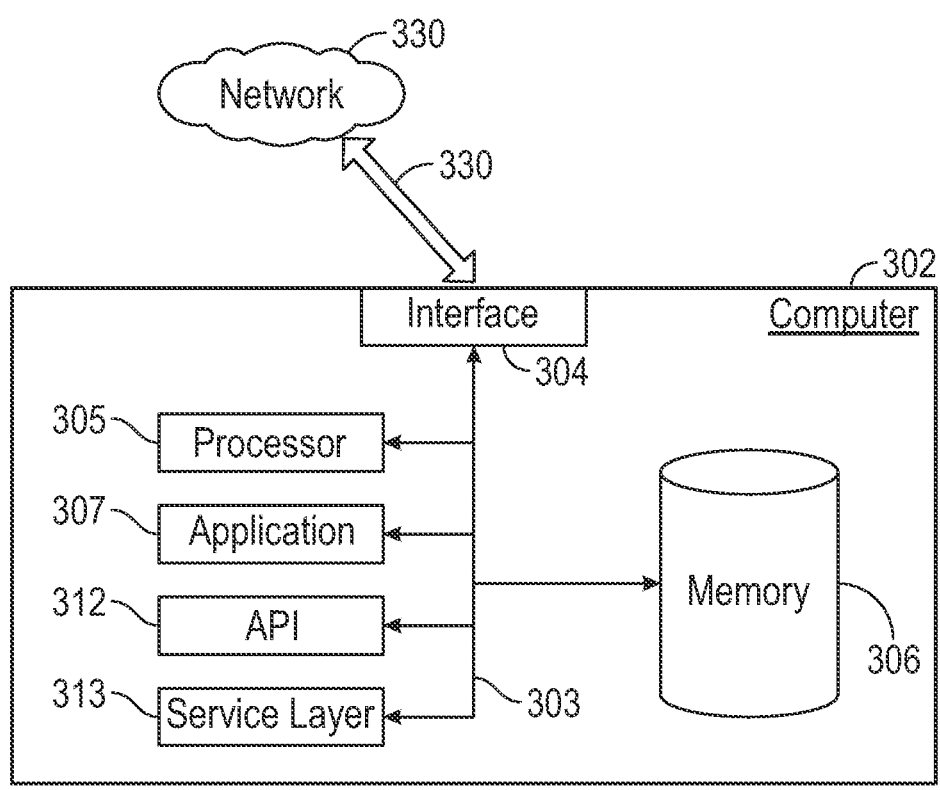
FIG. 3 shows a computer system in accordance with one or more embodiments.

FIG. 3 shows a computer (302) system in accordance with one or more embodiments. Specifically, FIG. 3 shows a block diagram of a computer (302) system used to provide computational functionalities associated with described algorithms, methods, functions, processes, flows, and procedures as described in the instant disclosure, according to an implementation. The illustrated computer (302) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (302) may include a computer that includes an input device, such as a keypad, keyboard, touch screen, or other device that can accept user information, and an output device that conveys information associated with the operation of the computer (302), including digital data, visual, or audio information (or a combination of information), or a GUI.

The computer (302) can serve in a role as a client, network component, a server, a database or other persistency, or any other component (or a combination of roles) of a computer system for performing the subject matter described in the instant disclosure. The illustrated computer (302) is communicably coupled with a network (330). In some implementations, one or more components of the computer (302) may be configured to operate within environments, including cloud-computing-based, local, global, or other environment (or a combination of environments).

At a high level, the computer (302) is an electronic computing device operable to receive, transmit, process, store, or manage data and information associated with the described subject matter. According to some implementations, the computer (302) may also include or be communicably coupled with an application server, e-mail server, web server, caching server, streaming data server, business intelligence (BI) server, or other server (or a combination of servers).

The computer (302) can receive requests over network (330) from a client application (for example, executing on another computer (302)) and responding to the received requests by processing the said requests in an appropriate software application. In addition, requests may also be sent to the computer (302) from internal users (for example, from a command console or by other appropriate access method), external or third-parties, other automated applications, as well as any other appropriate entities, individuals, systems, or computers.

Each of the components of the computer (302) can communicate using a system bus (303). In some implementations, any or all of the components of the computer (302), both hardware or software (or a combination of hardware and software), may interface with each other or the interface (304) (or a combination of both) over the system bus (303) using an application programming interface (API) (312) or a service layer (313) (or a combination of the API (312) and service layer (313). The API (312) may include specifications for routines, data structures, and object classes. The API (312) may be either computer-language independent or dependent and refer to a complete interface, a single function, or even a set of APIs. The service layer (313) provides software services to the computer (302) or other components (whether or not illustrated) that are communicably coupled to the computer (302).

The functionality of the computer (302) may be accessible for all service consumers using this service layer. Software services, such as those provided by the service layer (313), provide reusable, defined business functionalities through a defined interface. For example, the interface may be software written in JAVA, C++, or other suitable language providing data in extensible markup language (XML) format or other suitable format. While illustrated as an integrated component of the computer (302), alternative implementations may illustrate the API (312) or the service layer (313) as stand-alone components in relation to other components of the computer (302) or other components (whether or not illustrated) that are communicably coupled to the computer (302). Moreover, any or all parts of the API (312) or the service layer (313) may be implemented as child or sub-modules of another software module, enterprise application, or hardware module without departing from the scope of this disclosure.

The computer (302) includes an interface (304). Although illustrated as a single interface (304) in FIG. 3, two or more interfaces (304) may be used according to particular needs, desires, or particular implementations of the computer (302). The interface (304) is used by the computer (302) for communicating with other systems in a distributed environment that are connected to the network (330). Generally, the interface (304) includes logic encoded in software or hardware (or a combination of software and hardware) and operable to communicate with the network (330). More specifically, the interface (304) may include software supporting one or more communication protocols associated with communications such that the network (330) or interface's hardware is operable to communicate physical signals within and outside of the illustrated computer (302).

The computer (302) includes at least one computer processor (305). Although illustrated as a single computer processor (305) in FIG. 3, two or more processors may be used according to particular needs, desires, or particular implementations of the computer (302). Generally, the computer processor (305) executes instructions and manipulates data to perform the operations of the computer (302) and any algorithms, methods, functions, processes, flows, and procedures as described in the instant disclosure.

The computer (302) also includes a non-transitory computer (302) readable medium, or a memory (306), that holds data for the computer (302) or other components (or a combination of both) that can be connected to the network (330). For example, memory (306) can be a database storing data consistent with this disclosure. Although illustrated as a single memory (306) in FIG. 3, two or more memories may be used according to particular needs, desires, or particular implementations of the computer (302) and the described functionality. While memory (306) is illustrated as an integral component of the computer (302), in alternative implementations, memory (306) can be external to the computer (302).

The application (307) is an algorithmic software engine providing functionality according to particular needs, desires, or particular implementations of the computer (302), particularly with respect to functionality described in this disclosure. For example, application (307) can serve as one or more components, modules, applications, etc. Further, although illustrated as a single application (307), the application (307) may be implemented as multiple applications (307) on the computer (302). In addition, although illustrated as integral to the computer (302), in alternative implementations, the application (307) can be external to the computer (302).

There may be any number of computers (302) associated with, or external to, a computer system containing computer (302), each computer (302) communicating over network (330). Further, the term "client," "user," and other appropriate terminology may be used interchangeably as appropriate without departing from the scope of this disclosure. Moreover, this disclosure contemplates that many users may use one computer (302), or that one user may use multiple computers (302).

Figure 4:
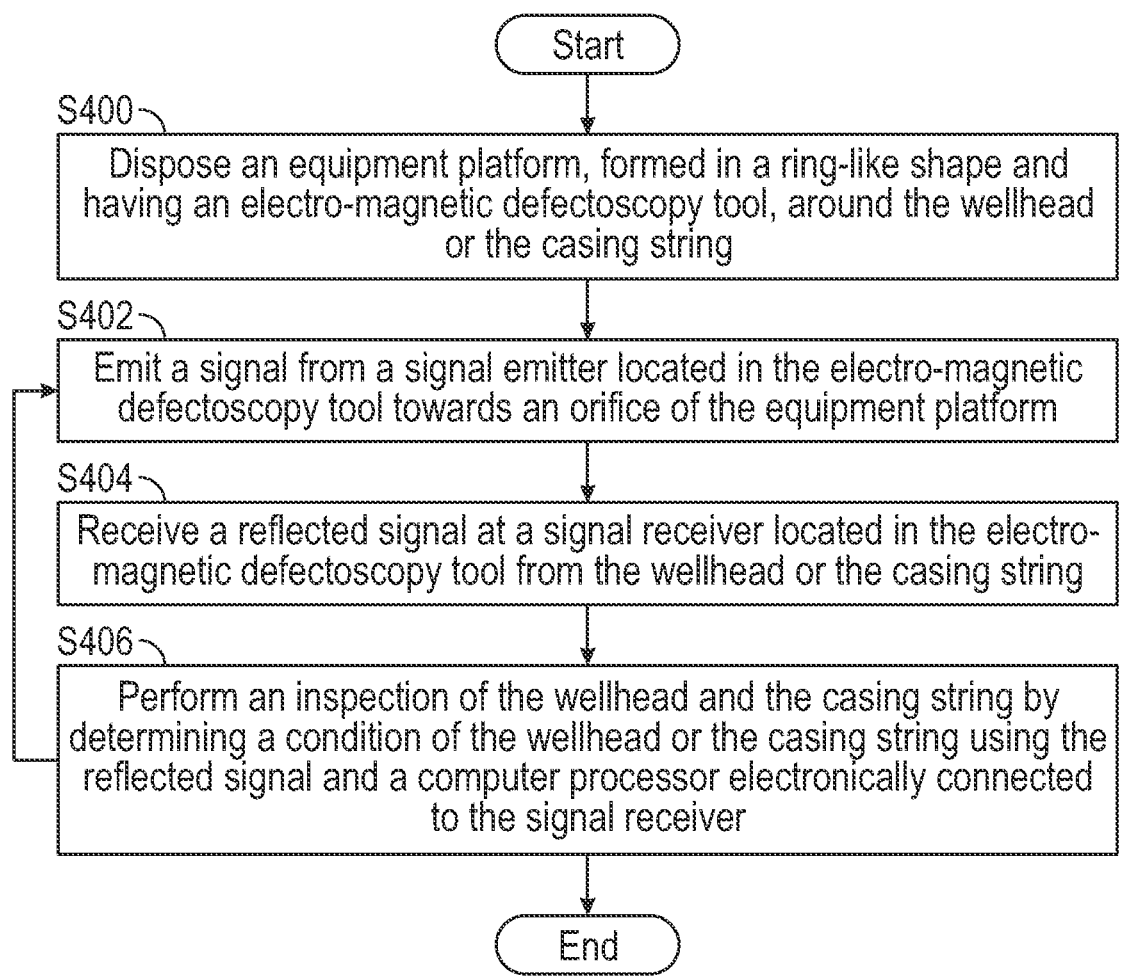
FIG. 4 shows a flowchart in accordance with one or more embodiments.

FIG. 4 shows a flowchart in accordance with one or more embodiments. The flowchart outlines a method for inspecting a wellhead (108) and a casing string, such as the conductor casing (114), surface casing (116), or production casing (118) of the well (100) outlined in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In S400, an equipment platform (200), formed in a ring-like shape and having an electro-magnetic defectoscopy tool (216), is disposed around the wellhead (108) or the casing (114, 116, 118) string. In accordance with one or more embodiments, the casing string may be the surface-extending portion of the conductor casing (114), surface casing (116), or production casing (118).

In further embodiments, one or more lifting hooks (208) may be installed on the equipment platform (200) and a wireline (206) may be connected to the lifting hooks (208) in order to suspend the equipment platform (200). In particular, the wireline (206) may be physically and electronically connected to a logging truck (204) having a spool (210) of wireline (206).

Thus, the logging truck (204) may be able to raise, lower, and rotate the equipment platform (200) around the wellhead (108), tree (102), and surface-extending portion of the downhole casing (114, 116, 118) strings using the wireline (206). In further embodiments, a computer (302) located in the logging truck (204) may be electronically connected to the wireline (206) and the spool (210) to send signals through the wireline (206) and instruct the spool (210) to rotate in order to lower or raise the equipment platform (200).

In further embodiments, a rotation device (212) may be connected to the wireline (206) and be able to receive instructions from the wireline (206) to rotate the equipment platform (200). In accordance with one or more embodiments, the equipment platform (200) has the ability to rotate 360 degrees using the rotation device. The rotation device (212) is electrically conductive such that the wireline (206) maintains a constant electrical communication between the computer (302) and the electro-magnetic defectoscopy tool (216).

In S402, an emitted signal (222) is emitted from a signal emitter (218) located in the electro-magnetic defectoscopy tool (216) towards an orifice (202) of the equipment platform (200). In accordance with one or more embodiments, the electro-magnetic defectoscopy tool (216) is connected to a data transmitter cable (214) located in the equipment platform (200). The data transmitter cable (214) allows the electro-magnetic defectoscopy tool (216) to be electronically connected through the wireline (206) to the computer (302) at the logging truck (204). Thus, the computer (302) may be able to send an instruction to the electro-magnetic defectoscopy tool (216) to instruct the signal emitter (218) to emit the emitted signal (222) and which type of signal to emit.

In accordance with one or more embodiments, the emitted signal (222) may be more than one electromagnetic signal each having a different strength and depth of investigation. Thus, each signal may reach different internal casing (114, 116, 118) strings or internal walls of the wellhead (108). In further embodiments, the emitted signals (222) may be sonic signals.

In further embodiments, a plurality of electromagnetic signals may be emitted at various intervals along the entire height and circumference of the wellhead (108) and the surface-extending portion of the casing (114, 116, 118) strings. A plurality of sonic signals may also be emitted at various intervals along the entire height and circumference of the wellhead (108) and the surface-extending portion of the casing (114, 116, 118) strings.

In S404, a reflected signal (224) is received at a signal receiver (220) located in the electro-magnetic defectoscopy tool (216) from the wellhead (108) or the casing (114, 116, 118) string. In accordance with one or more embodiments, a number and type of reflected signals (224) may be received at the signal receiver (220) depending on the number and type of emitted signals (222) sent by the signal emitter (218). The reflected signals (224) may be transmitted to the computer (302) from the electro-magnetic defectoscopy tool (216) using the data transmitter cable (214), located in the equipment platform (200), and the wireline (206).

In S406, an inspection of the wellhead (108) and the casing (114, 116, 118) string is performed by determining a condition of the wellhead (108) or the casing (114, 116, 118) string using the reflected signal (224) and a computer processor (305) electronically connected to the signal receiver (220). In accordance with one or more embodiments, the reflected signals (224) are processed by the computer processor (305) to determine a thickness of the walls at the various locations where the emitted signals (222) were reflected off of the wellhead (108) or off of the surface-extending portions of the casing (114, 116, 118) strings.

The computer processor (305) may be programed to monitor the thickness and strength of the walls of the wellhead (108) and the surface-extending portions of the casing (114, 116, 118) strings against the manufacturing nominal thickness. In accordance with one or more embodiments, the computer processor (305) may be programed to alert a user to a percent of metal loss that is determined by the manufacturer provided specification, engineering standards, established guidelines, or engineer's evaluation of the nominal thickness. This alert allows the user to make a decision regarding a repair operation.

In further embodiments, a quality assurance and quality check (QAQC) is used to analyze the overall inspection operation outlined above. If the result of the QAQC is not satisfactory, the wellhead (108) and the casing (114, 116, 118) string inspection operation may be repeated. In other words, if the results of the QAQC are not satisfactory, S402 to S406 may be repeated until the results of the QAQC are satisfactory. A satisfactory QAQC may be defined by operator's standard operating procedures or governmental regulations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for inspecting a wellhead and a casing string, the system comprising:
    an equipment platform formed in a ring-like shape having an orifice of a size large enough to fit a circumference of the wellhead or the casing string within the orifice;
    an electro-magnetic defectoscopy tool mounted to the equipment platform;
    a signal emitter located in the electro-magnetic defectoscopy tool and configured to emit a signal towards the orifice of the equipment platform;
    a signal receiver located in the electro-magnetic defectoscopy tool and configured to receive a reflected signal from the wellhead or the casing string; and
    a computer processor electronically connected to the signal receiver and configured to receive and use the reflected signal to determine a condition of the wellhead or the casing string.

2. The system of claim 1, wherein the signal emitter of the electro-magnetic defectoscopy tool is configured to emit more than one electromagnetic signals each having a different strength and depth of investigation.

3. The system of claim 1, wherein the signal emitter of the electro-magnetic defectoscopy tool is configured to emit a sonic signal towards the orifice of the equipment platform.

4. The system of claim 1, wherein the condition of the wellhead or the casing string further comprises a thickness of walls within the wellhead or the casing string.

5. The system of claim 1, wherein the equipment platform further comprises one or more lifting hooks.

6. The system of claim 5, wherein the lifting hooks are connected to a wireline.

7. The system of claim 6, wherein the wireline is electronically and physically connected to a logging truck configured to use the wireline to raise, lower, and rotate the equipment platform.

8. The system of claim 1, wherein the equipment platform further comprises a data transmitter cable.

9. The system of claim 8, wherein the electro-magnetic defectoscopy tool is electronically connected to a wireline through the data transmitter cable.

10. The system of claim 9, wherein the wireline is electronically connected to the computer processor.

11. A method for inspecting a wellhead and a casing string, the method comprising:
    disposing an equipment platform, formed in a ring-like shape and having an electro-magnetic defectoscopy tool, around the wellhead or the casing string;
    emitting a signal from a signal emitter located in the electro-magnetic defectoscopy tool towards an orifice of the equipment platform;
    receiving a reflected signal at a signal receiver located in the electro-magnetic defectoscopy tool from the wellhead or the casing string; and
    performing an inspection of the wellhead and the casing string by determining a condition of the wellhead or the casing string using the reflected signal and a computer processor electronically connected to the signal receiver.

12. The method of claim 11, wherein emitting the signal from the signal emitter further comprises emitting more than one electromagnetic signals each having a different strength and depth of investigation from the signal emitter.

13. The method of claim 11, wherein emitting the signal from the signal emitter further comprises emitting a sonic signal from the signal emitter towards the orifice of the equipment platform.

14. The method of claim 11, wherein determining the condition of the wellhead or the casing string further comprises determining a thickness of walls within the wellhead or the casing string.

15. The method of claim 11, wherein disposing the equipment platform around the wellhead or the casing string further comprises installing one or more lifting hooks to the equipment platform.

16. The method of claim 15, wherein disposing the equipment platform around the wellhead or the casing string further comprises connecting a wireline to the lifting hooks.

17. The method of claim 16, wherein disposing the equipment platform around the wellhead or the casing string further comprises raising, lowering, or rotating the equipment platform using a logging truck physically and electronically connected to the wireline.

18. The method of claim 11, wherein determining the condition of the wellhead or the casing string using the computer processor further comprises sending the reflected signal from the signal receiver to the computer processor.

19. The method of claim 18, wherein sending the reflected signal from the signal receiver to the computer processor further comprises transmitting the reflected signal from the signal receiver to a wireline using a data transmitter cable located in the equipment platform.

20. The method of claim 19, wherein sending the reflected signal from the signal receiver to the computer processor further comprises transmitting the reflected signal from the wireline to the computer processor.

* * * * *